United States Patent [19]
Fan

[11] Patent Number: 6,050,154
[45] Date of Patent: Apr. 18, 2000

[54] BICYCLE PEDAL

[76] Inventor: Jeeng-Neng Fan, No. 34, Alley 10, Lane 54, Sec. 2, Yangsin Rd., Yangmei, Taoyuan, Taiwan

[21] Appl. No.: 09/128,535

[22] Filed: Aug. 4, 1998

[51] Int. Cl.[7] .................................................. B62M 3/08
[52] U.S. Cl. ........................................ 74/594.4; 74/594.3
[58] Field of Search ............................... 74/594.4, 594.3, 74/594.7, 594.1, 594.2

[56] References Cited

U.S. PATENT DOCUMENTS

| | | | |
|---|---|---|---|
| 2,024,499 | 12/1935 | Baron | 74/594.4 |
| 4,625,580 | 12/1986 | Burt | 74/594.4 |
| 5,257,562 | 11/1993 | Nagano | 74/594.4 X |

*Primary Examiner*—Mary Ann Battista
*Attorney, Agent, or Firm*—Rosenberg, Klein & Lee

[57] ABSTRACT

An improved bicycle pedal is provided in which a sleeve is additionally installed at the lower extent of the pedal body, with a locating pin inserted through the sleeve and capable of freely swinging forward and rearward in an inverted U-shape locating tube. The horizontal section of the locating tube is secured to the threaded shaft of the bicycle crank and retains the free rotation capability. The pedal body and locating pin are both capable of free forward and rearward motion and swinging, and when the rider utilizes their feet on the respective pedal bodies to execute a circular pedaling movement, the pedal body is directly subjected to the pedaling force at the locating pin and is capable of providing the most natural and the most appropriate angle relative to the extension and retraction of the rider's legs, which not only effectively permits more comfort for the rider's legs, but also during the process of swinging produces a buffering effect that actually improves the pedal driving angle and achieves the production of pedaling force at maximum efficiency and conserves the magnitude of force required.

1 Claim, 6 Drawing Sheets

BICYCLE PEDAL

BACKGROUND OF THE INVENTION

The conventional bicycle pedal is generally configured as indicated in FIG. 1 and is mainly comprised of a pedal body (10), at the center of which is a threaded shaft (20) with ball bearings, retainers and other rolling components, and after the threaded shaft (20) is secured to the crank (30) of the bicycle, the aforesaid pedal body (10) retains free rotation capability and provides the bicycle rider the means of pedaling operation. Such a structure certainly can directly and conveniently provide the rider a means of pedaling on the bicycle and, furthermore, is an approached currently utilized by all bicycles. However, the inventor is also aware that maximum pedaling force, maximum performance, is achieved when force is applied to the pedals and the cranks (30) in a vertical arrangement. Conversely, when the pedals and the cranks (30) are in a linear arrangement, when the cranks (30) are in a vertical arrangement, then the pedaling force produced is at a minimum performance level. At this time, the pedaling force may even be insufficient to drive the cranks (30) into motion. Therefore, when the inventor operated the pedals of the aforesaid bicycle in a circular movement, since the threaded shafts (20) of the aforesaid pedals were secured to the ends of the cranks (30), of course the pedaling force of both feet reached the point at which the cranks (30) were linear (i.e., when the cranks (30) are in a vertical arrangement) and the force applied could not be utilized, and the free rotation of the pedal body (10) was required to support the straining two feet by swinging to produce an effective pedal driving angle. As such, during prolonged pedaling, the legs was easily fatigued and more uncomfortable and, furthermore, the various riding conditions required the exertion of more force. Actually, in cases where more force was produced, this was not evident when riding on smooth roads or downhill situations, only in uphill and rough road conditions. This demonstrated that aforesaid pedal was inadequate in terms of practical utilization.

Therefore, to effectively improve the aforementioned shortcomings, contributed to the widespread use of bicycles, and to enable the generation of pedaling force at the maximum efficiency to conserve the force required, while providing more comfort to both legs, the inventor improved on the design of the conventional device, which culminated in the introduction of the invention herein.

SUMMARY ON THE INVENTION

The primary objective of the invention herein is to provide a kind improved bicycle pedal, of which a forward and rearward free swinging motion occurs between the threaded shaft secured to the crank and the pedal body, such that after the threaded shaft is secured to crank, the aforesaid pedal body is capable of a free swinging motion forward and rearward. As such, when the rider executes the circular movement of the pedals while operating the bicycle, the pedals in the process of free swinging and motion provide the most natural and the most appropriate angle relative to the extension and retraction of both legs, which not only effectively permits more comfort for both legs, but also during the process of swinging produces a buffering effect that actually improves the pedal driving angle and achieves the production of pedaling force at maximum efficiency and conserves the magnitude of force required

DETAILED DESCRIPTION OF THE INVENTION

Figure 1:
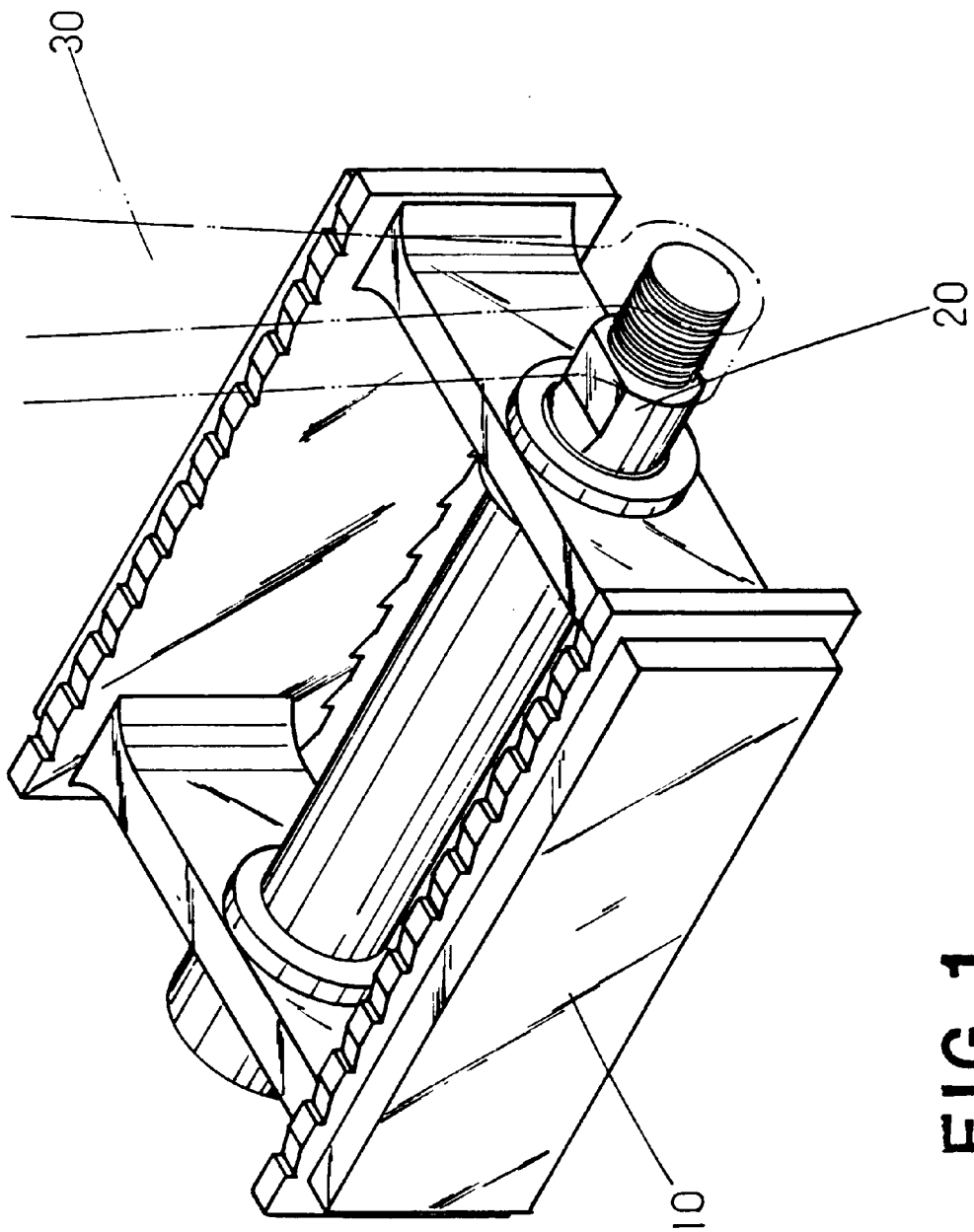
FIG. 1 is an isometric drawing of a conventional bicycle pedal.
Figure 2:
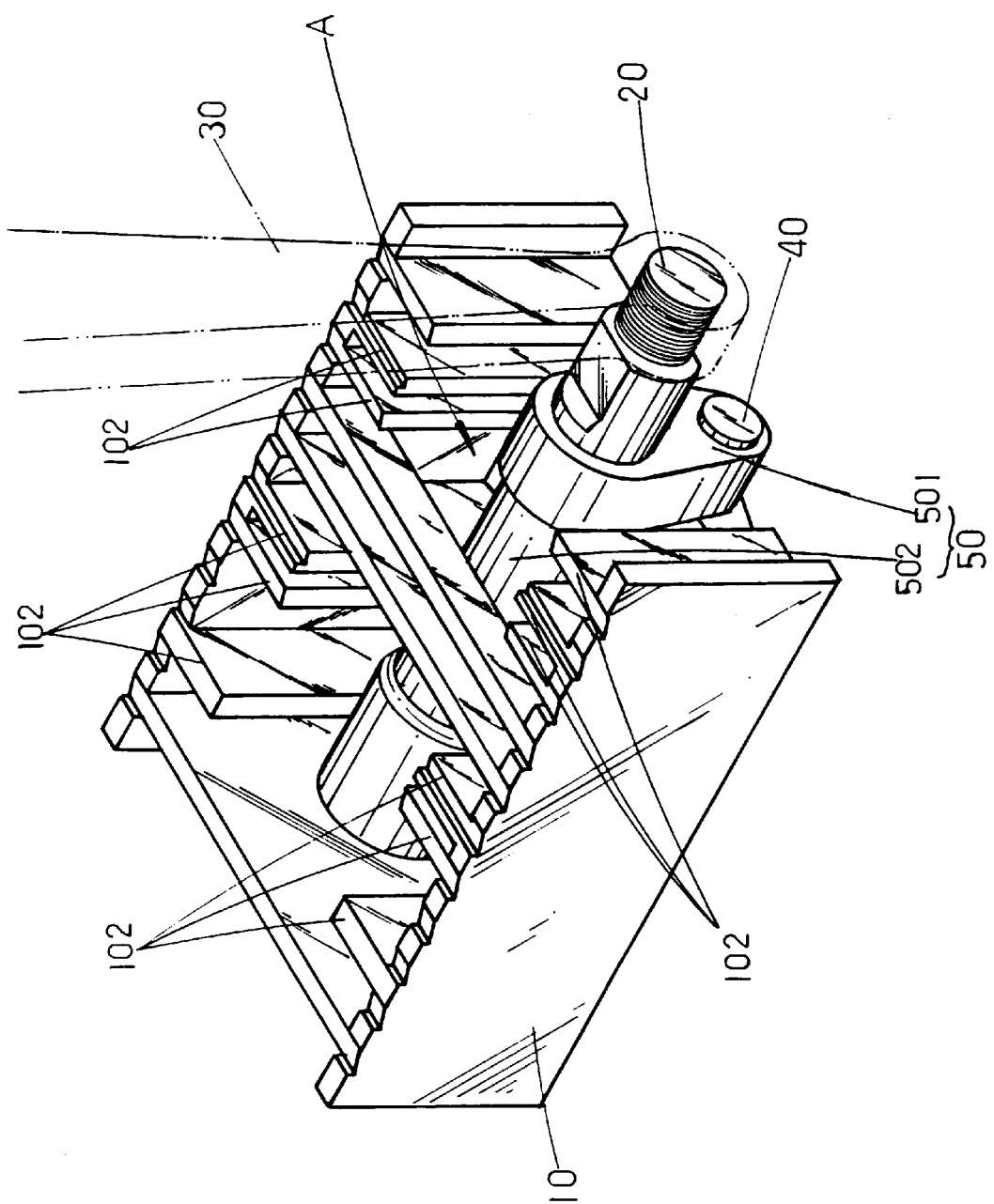
FIG. 2 is an isometric drawing of the present invention.
Figure 3:
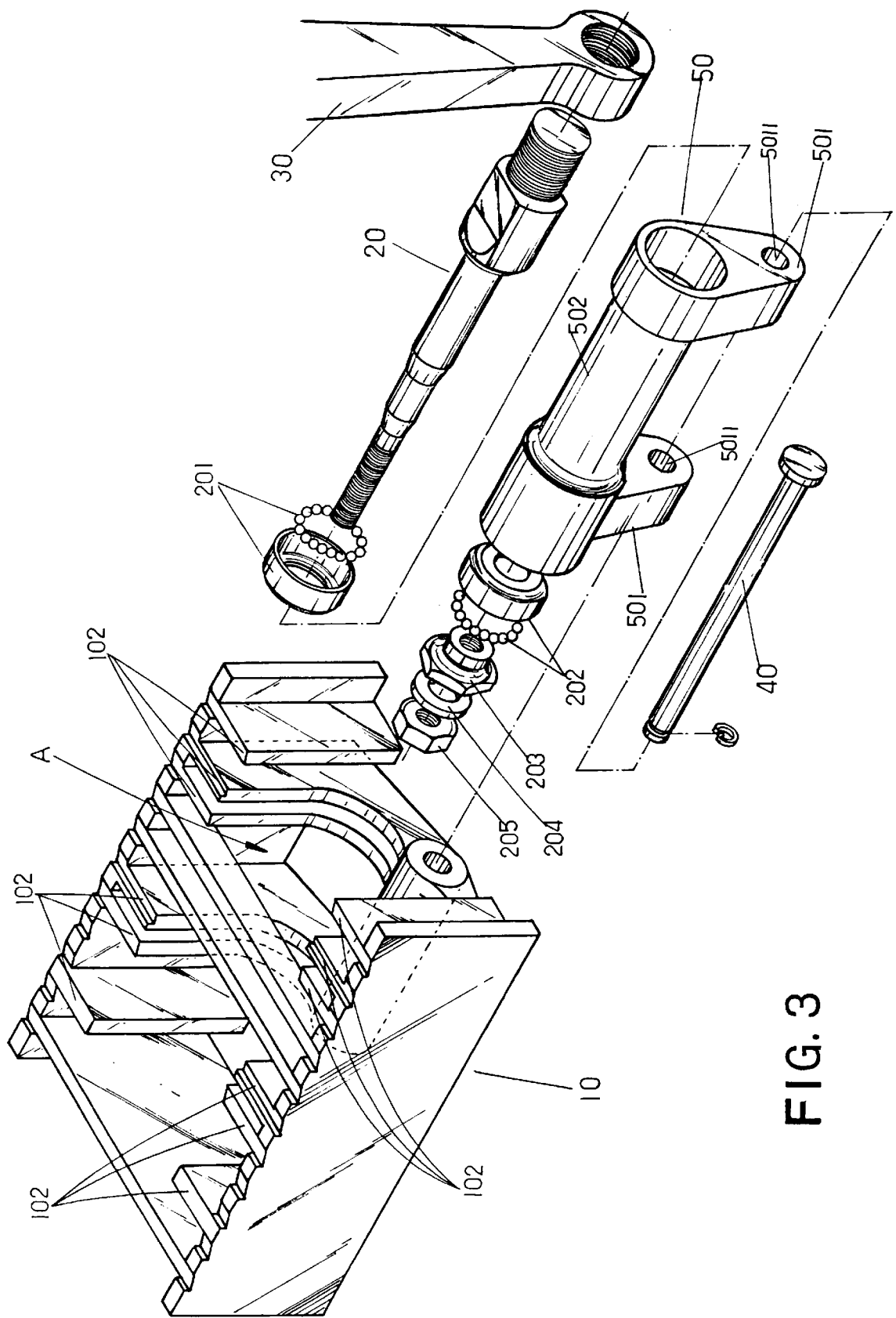
FIG. 3 is an exploded drawing of the present invention.
Figure 5:
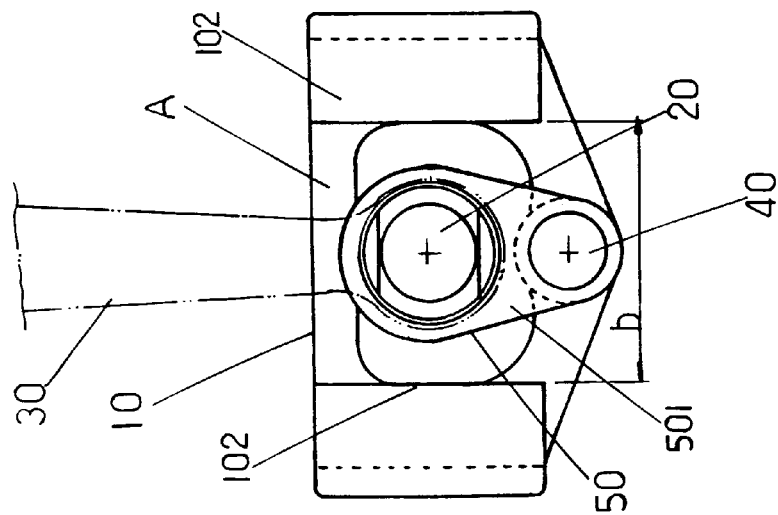
FIG. 5 is an elevation view of the present invention as viewed from a lateral perspective.
Figure 4:
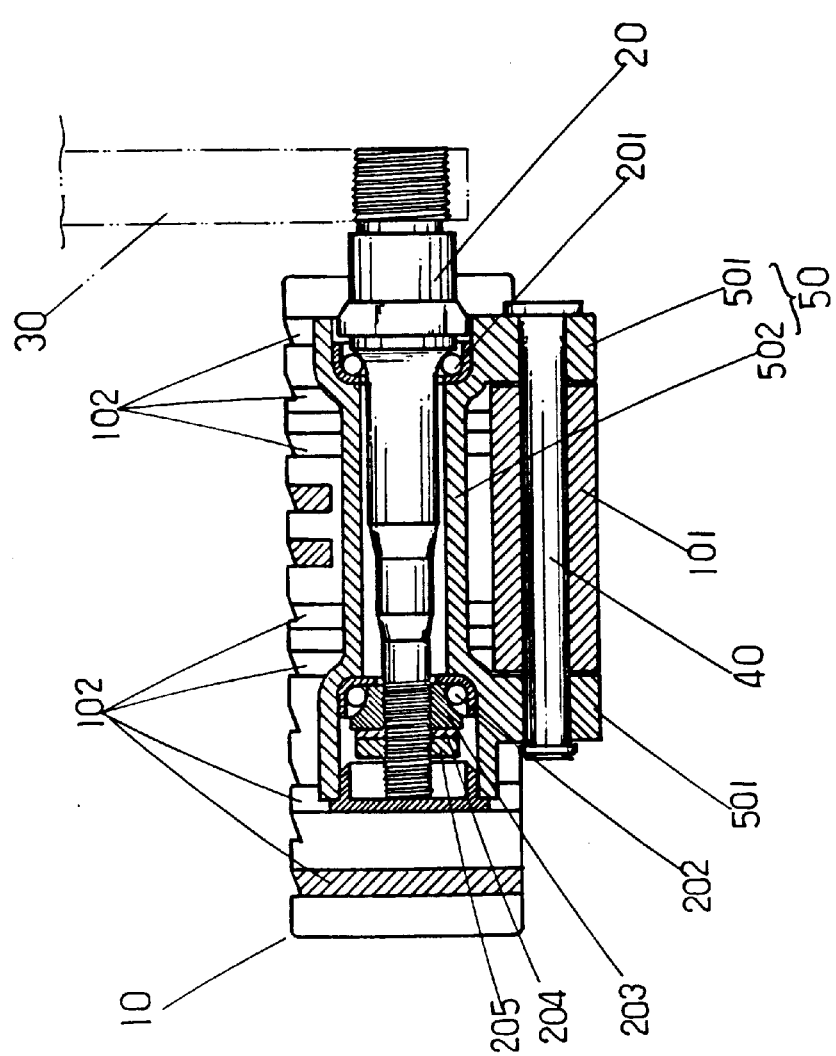
FIG. 4 is a cross-sectional drawing of the present invention as viewed from a frontal perspective.

Referring to FIG. 2, FIG. 3, FIG. 4 and FIG. 5, the invention herein is an improved bicycle pedal that is mainly comprised of a sleeve (101) on the upper extent of the pedal body (10) that extends downward, and at the upper extent and on each of the two sides of the sleeve (101) are limit tabs (102) that form the open containment section (A); furthermore, the aforesaid pedal (10) has a locating pin (40) capable of free rotation inserted into the locating tube (50), and the aforesaid locating tube (50) is of an inverted-U shape, with the two vertical sections (501) extending downward each having an insertion hole (5011), which provides for the insertion of the locating pin (40) during installation to the sleeve (101) and, furthermore, the positioning of the horizontal section (502) into the containment space (A) of the pedal body, and the aforesaid horizontal section (502) is a tubular body that accommodates the insertion of, in respective order of assembly, the threaded shaft (20), the front ball bearing/retainer (201), the back ball bearing/retainer (202), the bearing nut (203), the lock washer (204), and the nut (205), such that after the threaded shaft (20) is installed to the crank (30), the locating tube (50) remains capable of free rotation. The aforementioned threaded shaft (20), the front ball bearing/retainer (201), the back ball bearing/retainer (202), the bearing nut (203), the lock washer (204), and the nut (205) comprise a conventional assembly and, therefore, requires no further elaboration.

Figure 7:
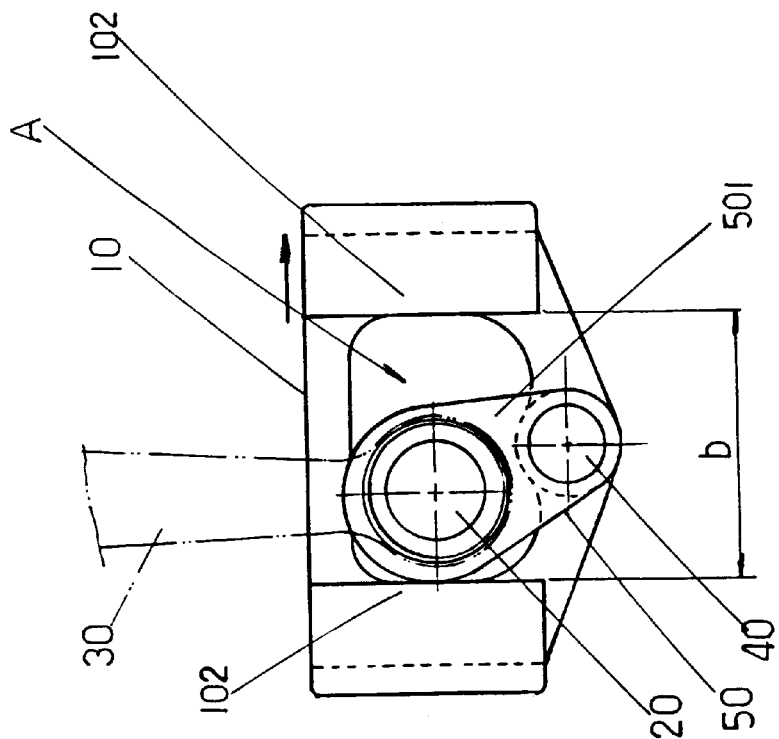
FIG. 7 is an elevation view of the pedal of the present invention depicted in forward motion.
Figure 6:
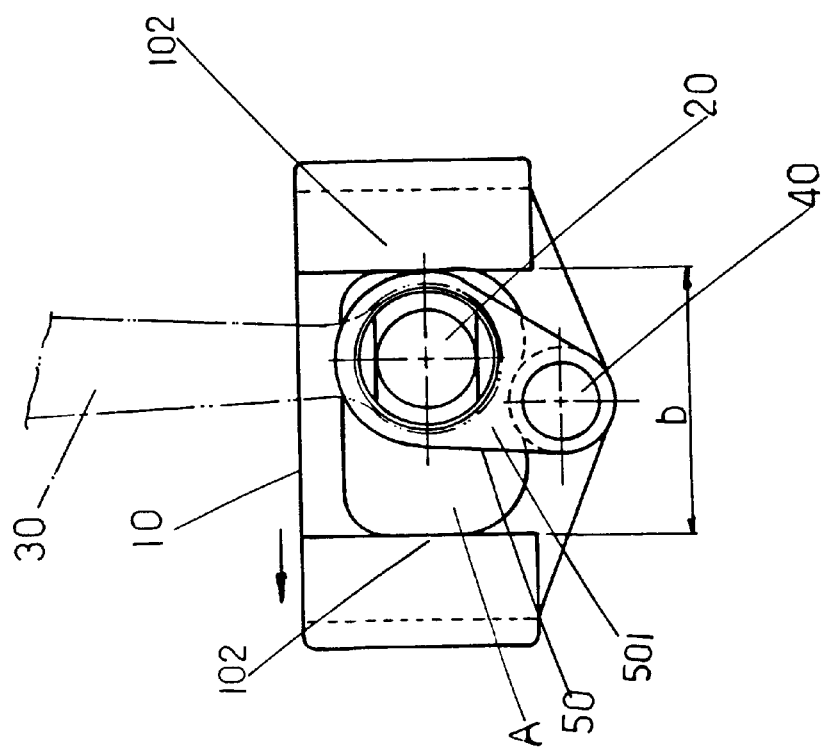
FIG. 6 is an elevation view of the pedal of the present invention depicted in rearward motion.
Figure 9:
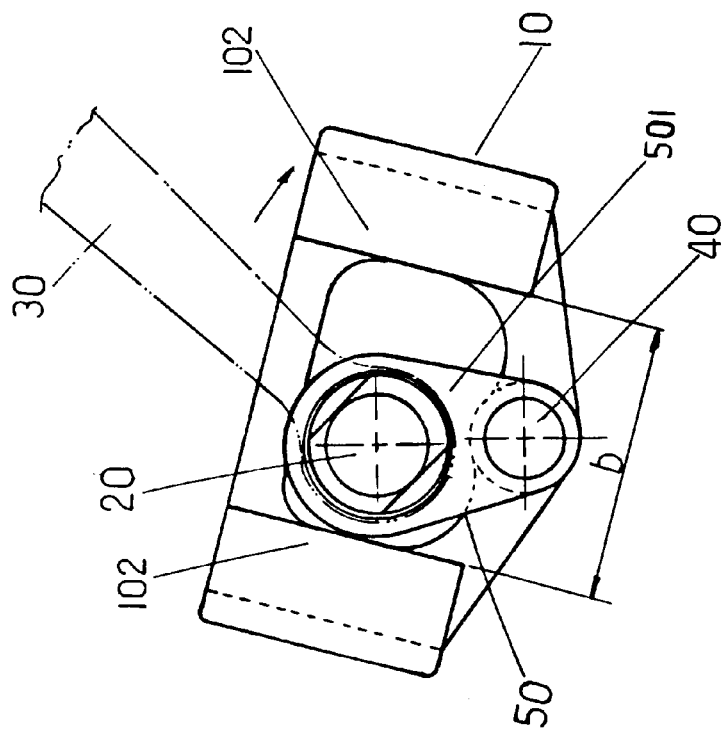
FIG. 9 is an elevation view of the present invention with the pedal facing upward and in forward motion.
Figure 8:
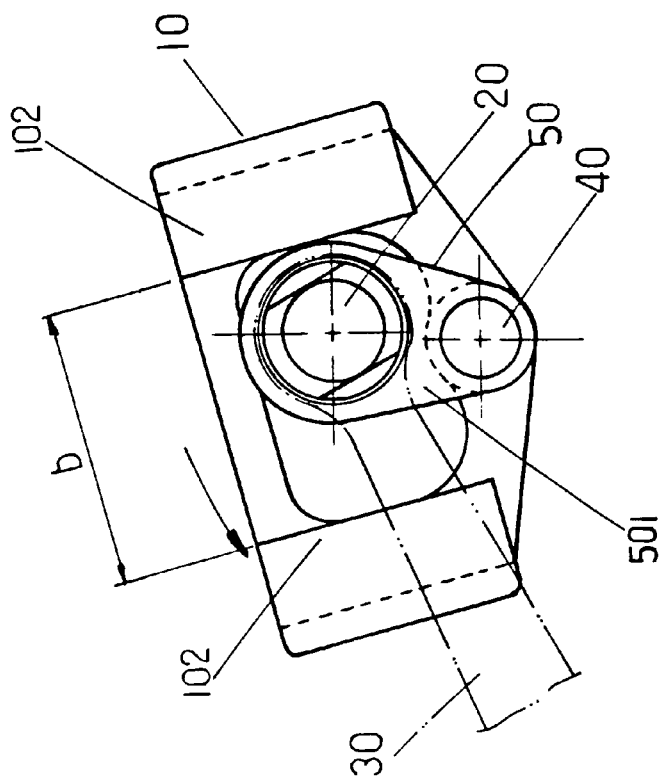
FIG. 8 is an elevation view of the pedal of the present invention with the pedal facing upward and in rearward motion.

Regarding the utilization of the aforementioned structure of the invention herein, as indicated in FIG. 6, FIG. 7, FIG. 8, and FIG. 9, since the locating tube (50) is at the lower extent of the vertical sections (501), and the locating pin (40) is capable of rotating freely as inserted into the sleeve (101) of the pedal body (10) as well as inside the locating tube (50) of the horizontal section (502) in conjunction with the freely rotatable threaded shaft (20), therefore, after the threaded shaft (20) is secured to the crank (30), the threaded shaft (20) serves as the axial point of the pedal body (10), the locating tube (50) through the vertical section (501) is the radius (i.e., the distance between the centers of the threaded shaft (20) and the locating pin (40)), and the distance (b) between the limit tabs (102) at the two sides of the pedal body (10) is the operational range of forward and rearward swinging motion (as indicated in FIG. 6, FIG. 7); and during forward and rearward motion, simultaneous upward and downward movement occurs in the process of free rotation (as indicated in FIG. 8 and FIG. 9).

In the foregoing configuration, the main function of the limit tabs (102) on the two sides of the aforementioned pedal body (10) is to stop the forward and rearward movement of the locating tube (50) by determining the distance (b), such that the pedal body (10) does not turn over during forward and backward motion, but remains based (i.e., the sleeve (101) of the pedal body (10) will not turn over and face upward due to an excessive distance of motion or angle), which maintains the placement of both feet and pedaling comfort; of course, in consideration of the strength and weight of the pedal body (10), the quantity of aforesaid limit tabs (102) is unrestricted.

Following the securing of the threaded shaft (20) to the crank (20) on the bicycle chain sprocket, since the physically exerted pedaling power is directly concentrated onto the locating pin (40), not the firmly secured threaded shaft (20), and the locating tube (50) serves as the axial point, onto which is conveyed the repeated forward and rearward swinging of the vertical section (501), such that the pedal body (10) and the locating pin (40) are linked in a forward and rearward movement, therefore, when the pedals are circularly revolved while riding, the locating pin (40), onto which the pedaling force is directly exerted, swings freely with the pedal body (10), directly coordinating with the extension and retraction of the legs and at the same time producing the most natural and most appropriate angle, which effectively eliminates the dead angle of the pedaling force applied by both legs (i.e., utilizing the coordinated free swinging and motion of the aforesaid locating pin (40) and pedal body (10) such that the pedaling force of both legs is not applied linearly to the crank (30)) and, at the same time, the aforesaid pedaling force is transferred at maximum efficiency, which achieves the practical objective of conserving the relative force required. Actually, this achieves maximum pedaling force possible, which is especially obvious in slope ascending situations.

Of course, the aforementioned locating pin (40) in the pedal body (10) is capable in the process of free swinging and motion of directly providing the most natural and the most appropriate angle relative to the extension and retraction of both legs, and the aforesaid pedal body (10) on the threaded shaft (20) is also capable of swinging freely, such that the ankles of the aforesaid legs are naturally more comfortable and less prone to fatigue during prolonged periods of pedaling and thereby effectively achieving an improvement of efficiency over the conventional device, which requires greater impetus from the ankles to produce the necessary driving angle.

Furthermore, due to the aforementioned configuration, the pedal body (10) to the locating pin (40) are uniquely capable of free motion and swinging, unlike conventional devices in which the pedal is directly mounted to the threaded rod (20) and possibility of such movement is precluded because of the immobility, therefore, when an uneven road surface is encountered, the pedal body (10) is automatically set in motion in reaction to the irregularities, and both feet on the aforesaid pedal body (10) are provided greater comfort due to the impact buffering effect, a form of absorption that is especially noticeable when riding the bicycle in the standing position, thereby improving the shortcoming of the conventional passive pedal, which transfers all the jarring vibrations to both feet.

What is claimed is:

1. A bicycle pedal for coupling to a shaft extending from an end of a bicycle crank, comprising:

a pedal body having a plurality of limit tabs respectively extending from opposing sides thereof to define an open containment section between opposed distal ends thereof;

a longitudinally extended sleeve coupled centrally to a lower portion of said pedal body below said open containment section; and, a locating tube having a longitudinally extended horizontal section disposed in said open containment section and a pair of vertical sections respectively disposed at opposing ends of said horizontal section, said horizontal section being displaceable between said opposing limit tabs and having a bore extending longitudinally therethrough for pivotal coupling to the shaft of the bicycle crank, each of said pair of vertical sections being coupled to said horizontal section on one end thereof and pivotally coupled to said sleeve on an opposing end to define a pivot axis spaced below an axis of the shaft of the bicycle crank throughout rotational displacement of the bicycle crank, each of said vertical sections having a through opening formed in aligned relationship with said bore, wherein said sleeve is arcuately displaceable relative to said shaft to provide a natural angle relative a rider's leg.

* * * * *